United States Patent
Kay (10) Patent No.: US 9,769,258 B1
(45) Date of Patent: Sep. 19, 2017

(54) APPLICATION SYNCHRONIZATION ACROSS MULTIPLE COMPUTERS

(71) Applicant: GOOGLE INC., Mountain View, CA (US)

(72) Inventor: Erik Kay, Emerald Hills, CA (US)

(73) Assignee: GOOGLE INC., Mountain View, CA (US)

( * ) Notice: Subject to any disclaimer, the term of this patent is extended or adjusted under 35 U.S.C. 154(b) by 281 days.

(21) Appl. No.: 14/575,580

(22) Filed: Dec. 18, 2014

Related U.S. Application Data (60) Provisional application No. 61/920,964, filed on Dec. 26, 2013.

(51) Int. Cl.
*H04L 29/08* (2006.01)
*G06F 9/445* (2006.01)

(52) U.S. Cl.
CPC ............ *H04L 67/1095* (2013.01); *G06F 8/60* (2013.01)

(58) Field of Classification Search
CPC ........................... H04L 67/1095; H04L 67/34
See application file for complete search history.

(56) References Cited

U.S. PATENT DOCUMENTS

| | | | | |
|---|---|---|---|---|
| 2006/0020937 A1* | 1/2006 | Schaefer | ............. | G06F 9/44505 717/175 |
| 2011/0154212 A1* | 6/2011 | Gharpure | .......... | G06F 17/30867 715/738 |
| 2013/0132874 A1* | 5/2013 | He | ...................... | G06F 3/04817 715/765 |
| 2014/0365603 A1* | 12/2014 | Denner | ............... | H04L 67/1095 709/217 |
| 2015/0296072 A1* | 10/2015 | Zhou | ................. | H04M 1/72525 455/414.1 |

* cited by examiner

*Primary Examiner* — Chris Parry
*Assistant Examiner* — Stephen Houlihan
(74) *Attorney, Agent, or Firm* — Brake Hughes Bellermann LLP (57) ABSTRACT

A method for synchronizing a set of one or more individual web apps and/or browser extensions to a user's computing device includes sending, from a server, one or more application stubs corresponding to the individual web apps or browser extensions in the set to the computing device. The method further includes establishing the ordered synchronization schedule prioritizing synchronization of the individual web apps or browser extensions in the set by size and/or a likelihood of use of the individual web apps or browser extensions on the user's computing device. The method involves sending, from the server to the computing device, application data including executable code associated with the individual web apps or browser extensions to synchronize the individual web apps or browser extensions in the set according to the ordered synchronization sequence.

21 Claims, 6 Drawing Sheets

510
Downloading icons and manifests of the individual web apps and browser extensions in the set to the new computing device

512
Listing or displaying the icons corresponding to the individual web apps and browser exw computing device

520
Establishing an ordered sequence of the individual web apps and browser extensions in the set

522
Using criteria including one or more of including one or more of an age of a web app (i.e. new or previously used), available version of the web app, size of the web app, relative frequency of prior use of the web app, time or date of last use of the web app, user preference, network loading and available bandwidth, etc. to establish the ordered sequence

530
Downloading or synchronizing web app data for the individual web apps and browser extensions in the set one by one according to the ordered sequence from a server to the new computing device

532
Displaying a synchronization status for one or more of the individual web apps and browser extensions in the set on the computing device.

534
Allowing manual initiation of the synchronization of an individual web application or browser extension

APPLICATION SYNCHRONIZATION ACROSS MULTIPLE COMPUTERS

CROSS REFERENCE TO RELATED APPLICATION

This application is a non-provisional of, and claims priority to, U.S. Patent Application No. 61/920,964, filed on Dec. 26, 2013, entitled "APPLICATION SYNCHRONIZATION ACROSS MULTIPLE COMPUTERS," which is incorporated by reference herein in its entirety.

TECHNICAL FIELD

This disclosure generally relates to applications or programs run on computing devices.

BACKGROUND

Cloud or network-based computing is a type of computing that relies on sharing computing resources rather than having local servers or personal devices to handle applications. Different services or resources (e.g., servers, storage, and applications) can be delivered to a user via a web browser. A user may have one or more accounts with cloud or network-computing service providers to utilize different cloud or network-based services and resources.

Generally, a web application ("web app") is a program that is written in a browser-executable language, for example, HTML5, JavaScript, and CSS, and is designed to be run within a web browser on a user's computing device. A web app that can run within the web browser may be either a "hosted web app" or a "packaged web app." A hosted web app may be, for example, hosted on the Internet or other network, available as a URL, and accessed by users using a web browser. The hosted web app's components on the Internet may include, for example, a portion of a web site that itself may include one or more web pages and possibly some metadata that may be pertinent to a functionality of the web app. In contrast to the hosted web app, a packaged web app may be thought of as a web app—all of whose components are bundled in a package that can be downloaded (e.g., from a public or private app store) for local execution by the browser on the user's computing device. A packaged web app may be executed even when the user's computing device is offline i.e. without access to a network or the Internet.

Furthermore, "platform" apps are apps that are developed to operate in their own application containers outside of a web browser on the user's computing device. A platform app may interact with and take advantage of operating system features and other software that may be typically installed on user's computing device but are not available to web apps.

Like a packaged web app, a platform app may also be bundled in a package that can be downloaded (e.g., from a public or private app store) via a web browser for local installation and execution on the user's computing device. The packaged platform app, like a packaged web app, may also be written in HTML5, JavaScript, and CSS. Both kinds of packaged apps can load the same type of content: HTML documents with CSS and JavaScript. However, in contrast to the within-browser operation of a packaged web app (or a hosted web app), a packaged platform app is designed to be installed on the user's computing device and run outside of a browser tab directly from the computing device's hard drive.

Web apps are popular due to the ubiquity of web browsers, and the convenience of using a web browser from any available computing device (e.g., laptop computer, smartphone, personal or private digital assistant, tablets, notebook computer, etc.) that can connect to the Internet. Common web apps include webmail, online retail sales, online auctions, photograph editing or processing, wikis, etc. The web apps may be customized or personalized, for example, with software components (e.g., plugins, extensions, or add-ons) that add specific features or functionalities to basic versions of the web apps.

A user may have a personalized set of one or more web apps on his or her computing device. The web apps on the computing device may be maintained or serviced by a cloud computing service. The cloud computing service may, for example, update the personalized set of web apps and synchronize associated or related data. For example, cloud computing service may update or synchronize an inbox of a webmail application installed on the user's computing device with e-mails received since the user last opened the webmail application, the levels that have been completed in a game application, the new features or program codes of an application that may have become available, photographs or images that may have been uploaded to and/or edited by a photo viewing/editing application, etc.

When a user is using a previously-used computing device having his or her personalized set of web apps, traditional difference-based data synchronization of the web apps may provide a satisfactory user experience from a speed or time perspective. However, when the user connects to the Internet with a new computing device, which does not have his or her personalized set of web apps, to launch a particular web app or web apps, traditional difference-based data synchronization may take time to replicate data for all of the personalized set of web apps on the new computing device. Traditional difference-based synchronization may not provide a satisfactory user experience from a speed or time perspective. The user may have to wait until data for all of the personalized set of web apps is synchronized or replicated on the new computing device before the user can use the new computing device to launch the particular web app or web apps.

SUMMARY

Web apps when executed may consume or generate data, which may be received or stored by the cloud computing service or other cloud storage. Data associated with or related to an app may be understood to include executable code for executing the app and personalization data (e.g., user profile data) that may be used to configure or personalize the app (e.g., its interfaces and functionality) on a computing device for a user, in addition to data consumed or generated by the app during execution.

In accordance with the principles of the disclosure herein, a user's new computing device may be configured with the user's personalized set of web apps. Data associated or related to the user's personalized set of web apps on the user's new computing device may be advantageously synchronized by a cloud computing service in a manner which minimizes or reduces wait times before the user can use the new computing device to launch a particular web app or web apps.

The details of one or more implementations are set forth in the accompanying drawings and the description below.

Other features will be apparent from the description and drawings, and from the claims.

BRIEF DESCRIPTION OF THE DRAWINGS

In the various drawings of FIGS. 1-5, like reference symbols indicate like elements.

DETAILED DESCRIPTION

A cloud computing service, with which a user may have an account, maintains and services web apps that may be launched or executed from the user's computing device (e.g., a desktop computer, notebook computer, netbook computer, tablet computer, smart-phone, etc.). The cloud computing service may monitor and track use of the web apps on one or more computing devices that may be logged into the user's account with the cloud computing service. Further, the cloud computing service may include an application and extension synchronizer ("app synchronizer") hosted on one or more cloud or network-based servers. The app synchronizer may be configured synchronize data ("web app data") associated or related to a set of web apps and/or browser extensions (collectively "web apps") between the cloud or network-based servers and one or more computing devices used by the user.

In accordance with the principles of the disclosure herein, a user's computing device may be configured with the user's personalized set of web apps. The computing device may be "new" in the sense that it may not have been previously connected to the user's account with the cloud computing service or may not have the user's personalized set of web apps installed thereon. To configure the user's new computing device, data associated or related to the user's personalized set of web apps may be advantageously synchronized by a cloud computing service onto the computing device in a manner which minimizes or reduces wait times before the user can use the computing device to launch a particular web app or web apps.

In accordance with the principles of the present disclosure, an example synchronization process for the set of web apps associated with a user may be performed in two stages. In a first stage of the synchronization process, application stubs (e.g., small program routines that substitute for longer programs, possibly to be loaded later or located remotely) and/or graphical user interface elements (e.g., icons) representing the web apps, may be downloaded from a server to a computing device (e.g., a new computing device) that is used by the user. Further, header files or application manifests, which may define the structure and content of the web apps, may also be downloaded from the server to the new computing device. The downloaded application stubs, icons or manifests may allow a quick visual representation of a list of web apps associated with the user that the user may be expect or anticipate will be available on the new computing device. The list of web apps may be displayed, for example, in an application launcher or as an arrangement of icons on a display screen on the computing device.

In a second stage of the synchronization process, web app data may be synchronized or downloaded to enable the web apps on the computing device. The synchronization of the web app data associated or related to the set of web apps on the user's computing device may be scheduled in a prioritized or ordered synchronization sequence of web apps. In one implementation, data for the user's web apps may be synchronized individually, web app-by-web app, in sequence. In another implementation, the user's web apps may be ordered or prioritized in groups of one or more web apps, and data for the user's web apps may be synchronized, group-by-group, in sequence. Data for the web apps in a group may be synchronized in parallel or in random order. Additionally, in some implementations, the representation of the list of web apps or arrangement of icons on the computing device may include visual indicators of the synchronization states of individual web apps (e.g., "synchronized", "synchronization-in-progress," "awaiting synchronization," etc.).

A web app (or group of web apps) may be positioned in the ordered synchronization sequence according to a priority score or a synchronization rank, which may be assigned to the web app, based one or more app characteristics and/or system conditions. The synchronization rank may, for example, be based on web characteristics such as a size of the web app, a frequency of prior use and/or a recency of use of the web app by the user (which, for example, may be tracked by the cloud computing service). In assigning the synchronization rank to the web app for its position in the ordered synchronization sequence, web app characteristics (e.g., size) may balanced with system conditions such as available memory on the user's computing device, available network bandwidth, network reliability and costs for communication with user's computing device, etc.

In an example implementation, synchronization ranks may be assigned to the web apps with a view to make at least a small number of the web apps, which the user is likely to use first on the computing device, available on the computing device quickly. Keeping with this view, the synchronization ranks assigned to the web apps may be based on consideration of a combination of factors including, for example, the frequency and recency of usage and the sizes of the web apps. Web apps that have a small size or have frequent or recent usage may be assigned high synchronization ranks. Conversely, web apps that have a large size or do not have frequent or recent usage may be assigned low synchronization ranks. Web apps with high synchronization ranks may be expected to be synchronized before web apps with low synchronizations ranks.

In some implementations, user input may supersede or modify the ordered synchronization sequence and guide or control which web apps should be synchronized first. A web app selected by the user (e.g., by user click on an app icon, or by user designation of a web app in the application launcher on the computing device) may be synchronized ahead of other web apps regardless of the synchronization ranks of other web apps in the ordered synchronization sequence. The user-selected web app may, for example, be synchronized immediately possibly suspending or pausing in-progress synchronizations of the other web apps in the ordered synchronization sequence. In some implementations, web apps with low synchronization ranks (e.g., web apps that very large and not recently used) may not be synchronized until the user specifically requests or initiates synchronization.

Figure 1:
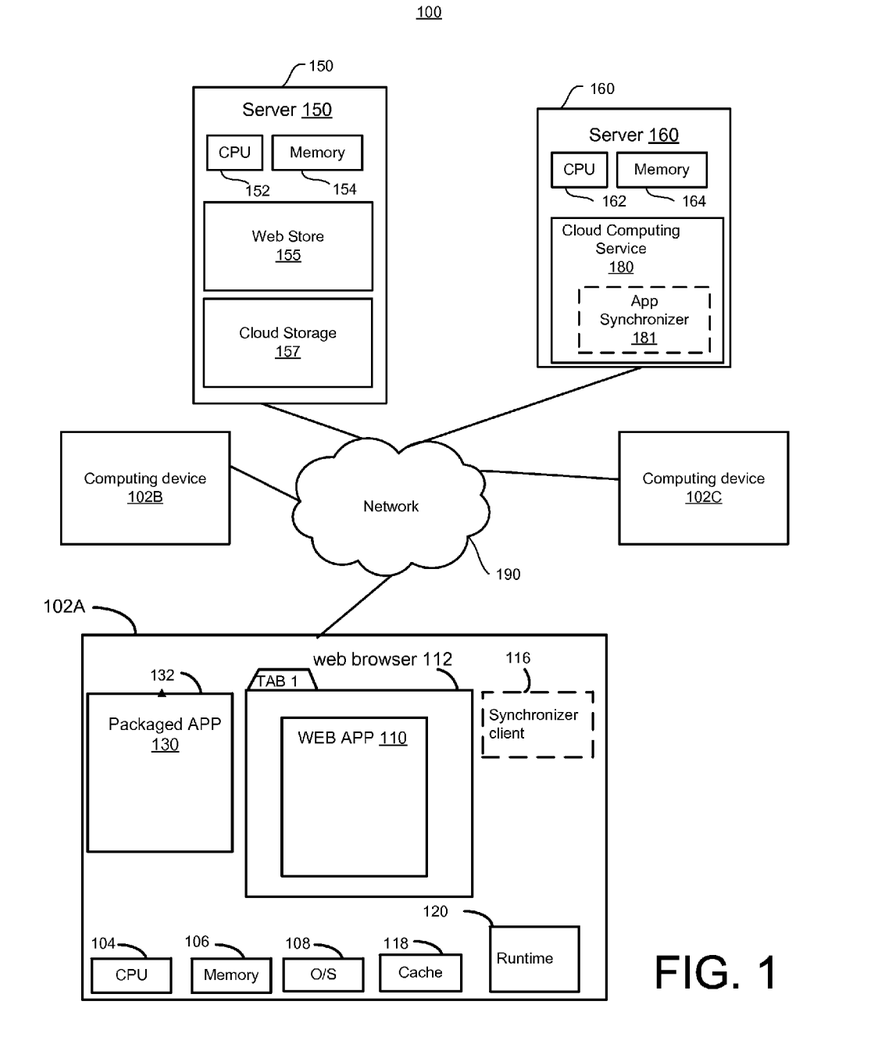
FIG. 1 is a schematic block diagram illustrating an example system in which an application and extension synchronizer maintains or services a set of web apps on a user's computing device, in accordance with the principles of the disclosure herein.

FIG. 1 shows an example system 100 in which a cloud computing service 180 maintains or services a set of web apps (e.g., set of web apps 210, FIG. 2) on a user's computing device. Cloud computing service 180 may include an application and extension data synchronizer 180 ("app synchronizer 180") configured to synchronize web app data between a server and the user's computing device.

With reference to FIG. 1, system 100 may include one or more computing devices 102A, 102B, 102C (e.g., desktop computers, notebook computers, netbook computers, tablet computers, smart-phones, etc.) connected over a network 190 to app synchronizer 180 hosted on a sever 160. An example computing device 102A, 102B, 102C may include one or more processors (e.g., CPU 104), one or more memories (e.g., memory 106), an operating system (e.g., O/S 108), and a cache (e.g., cache 118). O/S 108 may, for example, be a Chrome operating system or other native operating system (e.g., Windows, Linux, Unix or Mac OS X, etc.). Computing device 102A, 102B, 102C or O/S 108 may include or support a software or user interface (e.g., a browser) or a system-specific client (e.g., synchronization client 116) through which computing device 102A, 102B, 102C can access applications and resources residing on the web. Computing device 102A, 102B, 102C may execute a runtime 120 and various applications (e.g., a web application 110, a packaged application 130, etc.). Web application 110 may run in a tab of web browser 112, which may be provided by O/S 108. Platform app 130, which may installed on a hard drive or memory of computing device 102A, 102B, 102C, may run outside of the web browser in its own application containers 132. Synchronization client 116 (or other corresponding system-specific client software) running on computing device 102A, 102B, 102C may communicate with cloud computing services and resources (e.g., cloud storage 157, app synchronizer 180, etc.) causing updates on one side to be propagated to the other so that both sides normally contain the same data.

Computing device 102A, 102B, 102C may be linked via a network 190 to one or more web servers (e.g., server 150 and server 160, etc.). Server 150 and server 160 may each include one or more CPUs and memories (e.g., CPU 152/Memory 154, and CPU 162/Memory 164, respectively). Each of the servers may, for example, be configured to deliver various web content (e.g., web pages, data storage, applications, etc.) to computing devices (e.g., computing device 102A, 102B, 102C) via network 190. Server 150 may, for example, include a cloud storage 157 and a web store 155 (e.g., a public or private web store). Cloud storage 157 may be a subscription-based storage service for storing user data, files or documents in a user account, which the user can access from any web-connected computing device. Web store 155 may be a web store which publishes or otherwise makes available applications for downloading on and execution from users' computing devices.

A user may download many (possibly tens or hundreds) of web apps from web store 155 (or other sources on the web) for use on his or her computing device. The web apps may be represented on the computing device by short program routines or application stubs that can be activated to access full application programs, which may be located remotely (e.g., on the web). The web apps may be customized or personalized for the user.

Figure 2:
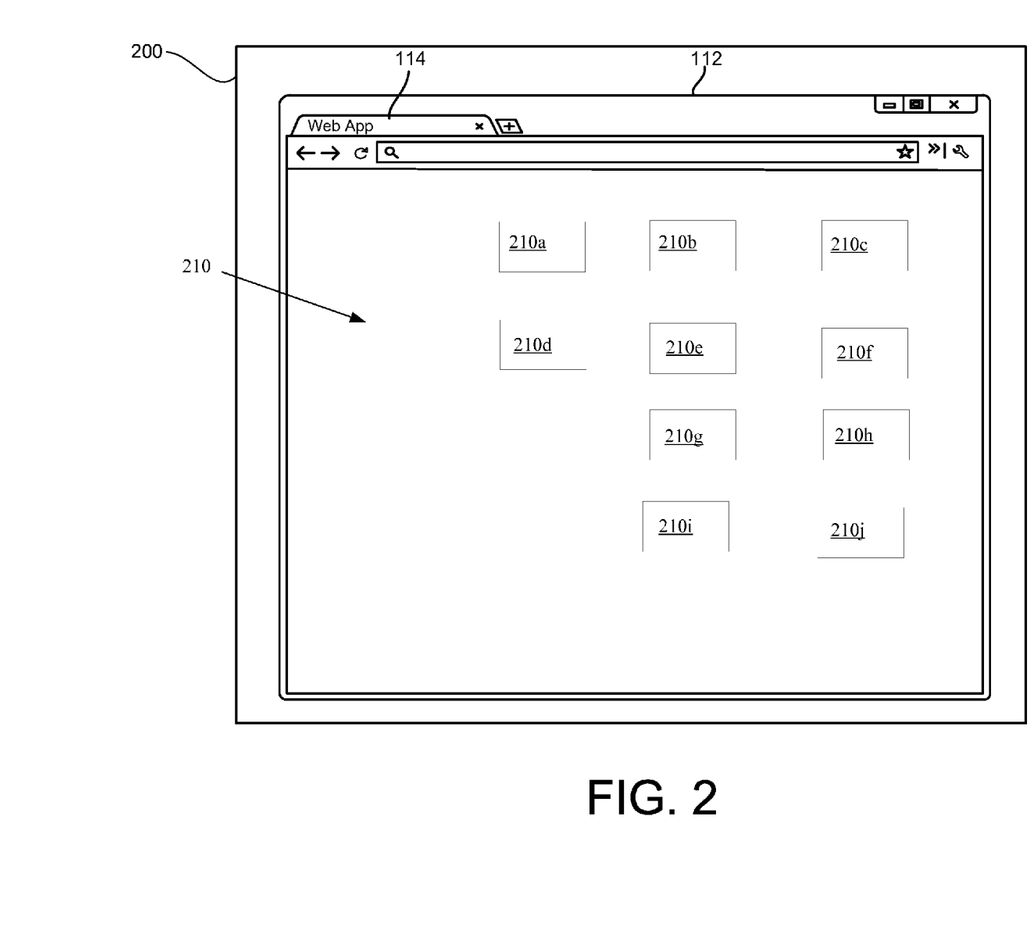
FIG. 2 is a schematic illustration of an example personalized set of web apps that a user may have on his or her computing device.

FIG. 2 shows an example personalized set of web apps 210 that a user may have on his or her computing device (e.g., computing device 200). The web apps may be individually selectable or operable by the user, for example, via graphical user interface (GUI) elements (drop down boxes, menu lists, icons, etc.) on the computing device. FIG. 2 shows, for example, individual apps in the set of web apps 210 displayed as interactive app icons or buttons 210a-210j in a tab 114 of web browser 112 on computing device 200.

With renewed reference to FIG. 1, a server 160 may host, for example, cloud computing services module 180 including an app synchronizer 181. Cloud computing services module 180 may maintain a user account with a list of web apps in the user's personalized set of web apps (e.g., web apps 210) and monitor web app use on the user's computing device. App synchronizer 181 may be configured to update or synchronize app versions and web apps data, over network 190, so that the web apps on the user's computing device and cloud servers have the same latest versions, configurations, data and app states.

In a first scenario in which web apps 210 have been previously used from or on the local computing device (e.g. computing device 200) that the user uses to access the cloud computing services module 180, it may be expected that difference-based synchronization of individual web apps 210a-210j in the user's personalized set of web apps 210 may involve updating only small amounts of data. For such a first scenario, cloud computing service module 180/app synchronizer 181 may be configured to synchronize individual web apps 210a-210j automatically in any order (e.g., a random order) when computing device 200 is connected to network 190/cloud computing service module 180.

In a second scenario, a user may connect through network 190 to cloud computing service module 180 using a "new" computing device (e.g., computing device 300, FIG. 3) on which the user's personalized set of web apps 210 is not installed (or is partially installed). In such a scenario, cloud computing service module 180/app synchronizer 181 may be configured to synchronize or replicate individual web apps 210a-210j in the user's personalized set of web apps 210 in an ordered synchronization sequence. The ordering of which web app to synchronize or replicate ahead of another web app in the ordered synchronization sequence may be based on consideration of one or more factors including, for example, an age of a web app (i.e. new or previously used), a size of the web app (e.g., 500 MB or 5 MB), a frequency of prior use of the web app by the user, recentness of use of the web app by the user, an immediate user preference or demand (e.g. an user's attempt to launch a particular web app by selecting an app icon on computing device 300), and communication network (e.g., network 190) conditions (e.g., network loading, available bandwidth, reliability, etc.).

Figure 3:
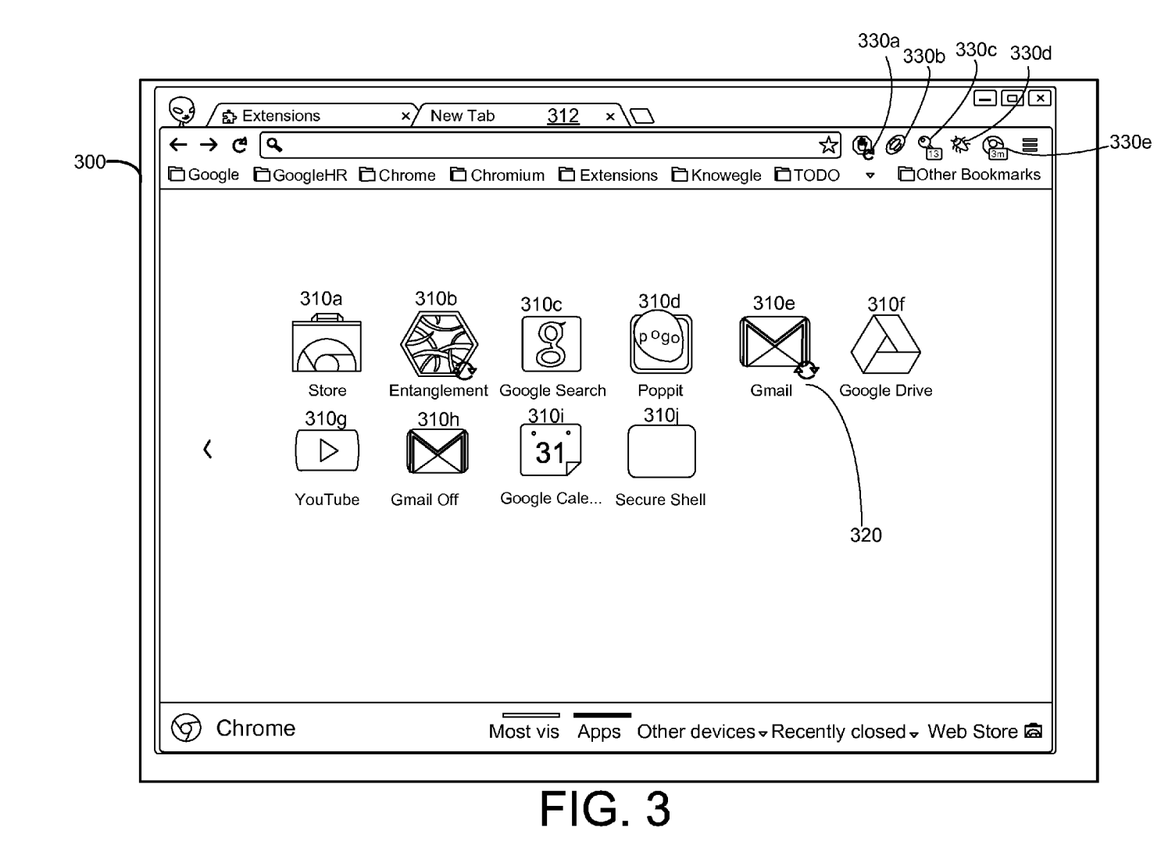
FIG. 3 is a schematic illustration of an example user interface (UI) in which a cloud computing service module/app synchronizer may visually display a live synchronization status for individual web apps in a user's personalized set of web apps and browser extensions on a computing device, in accordance with the principles of the disclosure herein.

A web app may be selected for synchronization or replication ahead of another web app in the ordered synchronization sequence with a view to provide at least some web app functionality on the new computing device to the user without having the user wait for all the web apps to be synchronized or replicated. In case the user attempts to launch a particular web app (e.g., by clicking on the corresponding app icon) before it has been synchronized or enabled on computing device 300, synchronization of the particular web app may take precedence over synchronization of other web apps in the ordered synchronization sequence. Any in-progress synchronizations of the other web apps may be paused or put on hold until the particular web app is synchronized or enabled on computing device 300.

In an example implementation, cloud computing service module 180 may be configured to synchronize the web apps and browser extensions to a user's new computing device using app synchronizer 181, for example, in a two-stage synchronization process. In the first stage of the synchronization process, all web app and browser extension manifests and icons may be synchronized or downloaded to the new computing device. In the second stage of the synchronization process, web app data may be synchronized for each web app one at a time in an ordered synchronization sequence. The ordered synchronization sequence may be determined as a sequence that may be intended to prioritize the synchronization of the user's most-likely-to-be-used apps over apps that are determined to be less likely to be used at least immediately. The ordered sequence of web apps may be based on various priority factors. For example, the ordered synchronization sequence may be based on a size of a web app and a time of last use of the web app. For example a web app, which is 500 MB in size, may be synchronized after smaller web apps (e.g., 5 Mb in size) are synchronized. A web app which has not been used by the user, for example, in two weeks, may be synchronized after a web app that was used two days ago.

Cloud computing service module 180/app synchronizer 181 may be further configured to list or otherwise depict on the computing device, a live synchronization status for the individual web apps and browser extensions in the user's personalized set of web apps, in accordance with the principles of the disclosure herein. Having the live synchronization status for the individual web apps depicted on the computing device may allow the user to launch or start executing a particular web app as soon as it is synchronized or replicated on the computing device. The processes for synchronizing or replicating the remaining individual web apps on the computing device may continue in the background even as the particular web app is being executed.

FIG. 3 shows an example user interface (UI) arrangement in which cloud computing service module 180/app synchronizer 181 may visually display a live synchronization status for individual web apps in the user's personalized set of web apps 210 (and the synchronization statuses of browser extensions) on an example computing device 300. The example UI may include interactive GUI elements which may allow manual initiation of the synchronization of individual web apps.

In the example UI shown in FIG. 3, individual web apps may be depicted visually by icons (e.g., icons 310a-310j) in web browser 312 on computing device 300. Similarly, individual extensions to browser 312 may be depicted or shown as icons (e.g., icons 330a-330e) in a ribbon banner or tab header of web browser 312.

The icons shown in the UI may be marked by distinctive color, design patterns, brand name or logos for easy visual identification of the corresponding web apps or extensions. The icons shown in the UI may be further marked or associated with status indicia that may, for example, visually depict "synchronization states" of the corresponding web apps or extensions. A web app icon (e.g., icon 301b, 310d or 310e) may, for example, be shown in an unsynchronized or disabled state (e.g., greyed out or dimmed), if the corresponding web app or extension has not yet been synchronized or replicated on computing device 300. A web app icon (e.g., icon 310d and 310e) corresponding to a web app that is presently being synchronized or replicated may, for example, be marked with a visual busy indicator (e.g., busy indicator 320). A web app icon (e.g., icon 310a, 310c, and 310f-310j) corresponding to a web app that has been synchronized or replicated on computing device 300 may, for example, be displayed in a synchronized or enabled state (e.g., undimmed in their full color strength).

Like the web app icons, extension icons (e.g., icon 330a and 330b) may be shown in an unsynchronized or disabled state (e.g., greyed out or dimmed) if the corresponding extension has not been fully synchronized or updated. Extension icons (e.g., icon 330b) corresponding to extensions that are presently being synchronized or replicated may marked with a visual busy indicator (e.g., busy indicator 320) to show their "in-progress" synchronization state. Extension icons (e.g., icons 330c-330e) corresponding to extensions that have been synchronized or replicated may be displayed undimmed in their full color strength.

The user may launch or execute a particular synchronized web app or extension on computing device 300 at any time, for example, by clicking on the corresponding icon (e.g., icons 310, 310c, 310f-310j, or 330C-330e). Cloud computing service module 180/app synchronizer 181 may be configured to continue synchronizing or replicating other web apps or extensions in the background even as the particular synchronized web app or extension is executing.

Cloud computing service module 180/app synchronizer 181 may be further configured so that a user can select or activate a web app or browser extension with a disabled status for immediate synchronization. A user may, for example, click on an icon corresponding to a web app or browser extension with a disabled status (e.g., a greyed out or dimmed icon) to move the corresponding web app or browser extension ahead in the ordered sequence for immediate synchronization or replication. For example, with reference to FIG. 3, a greyed out icon 310d may correspond to a web app "Poppit", which would normally sync last in the ordered sequence, since it may be the largest and least-recently played web app in the set of web apps 210. However, by clicking on icon 310d, the user may cause the web app labeled Poppit to sync first ahead of other outstanding web apps in the ordered sequence. Similarly, clicking an unsynced or disabled extension may cause that extension to sync ahead of other outstanding extensions in the ordered sequence.

As described above in the first stage of the two-stage synchronization process for web apps and browser extensions, computing service module 180/app synchronizer 181 may download web app stubs, manifests and icons to computer 300. In the second stage of the two-stage synchronization process, computing service module 180/app synchronizer 181 may automatically attempt to synchronize most if not all of the web apps or browser extensions corresponding to the downloaded web app stubs, manifests and icons. However, in an alternate implementation, computing service module 180/app synchronizer 181 may be configured to attempt to synchronize at least some of the individual web apps or browser extensions only upon user input or demand (e.g., when a user attempts to launch a web app). User input or demand for synchronization of individual web apps or browser actions may be received, for example, via interactive GUI elements (e.g., checkboxes, icons, buttons, etc.) or user interface actions such as mouse or pointer clicks, verbal commands, taps or swipes on a touch screen, etc.

Figure 4:
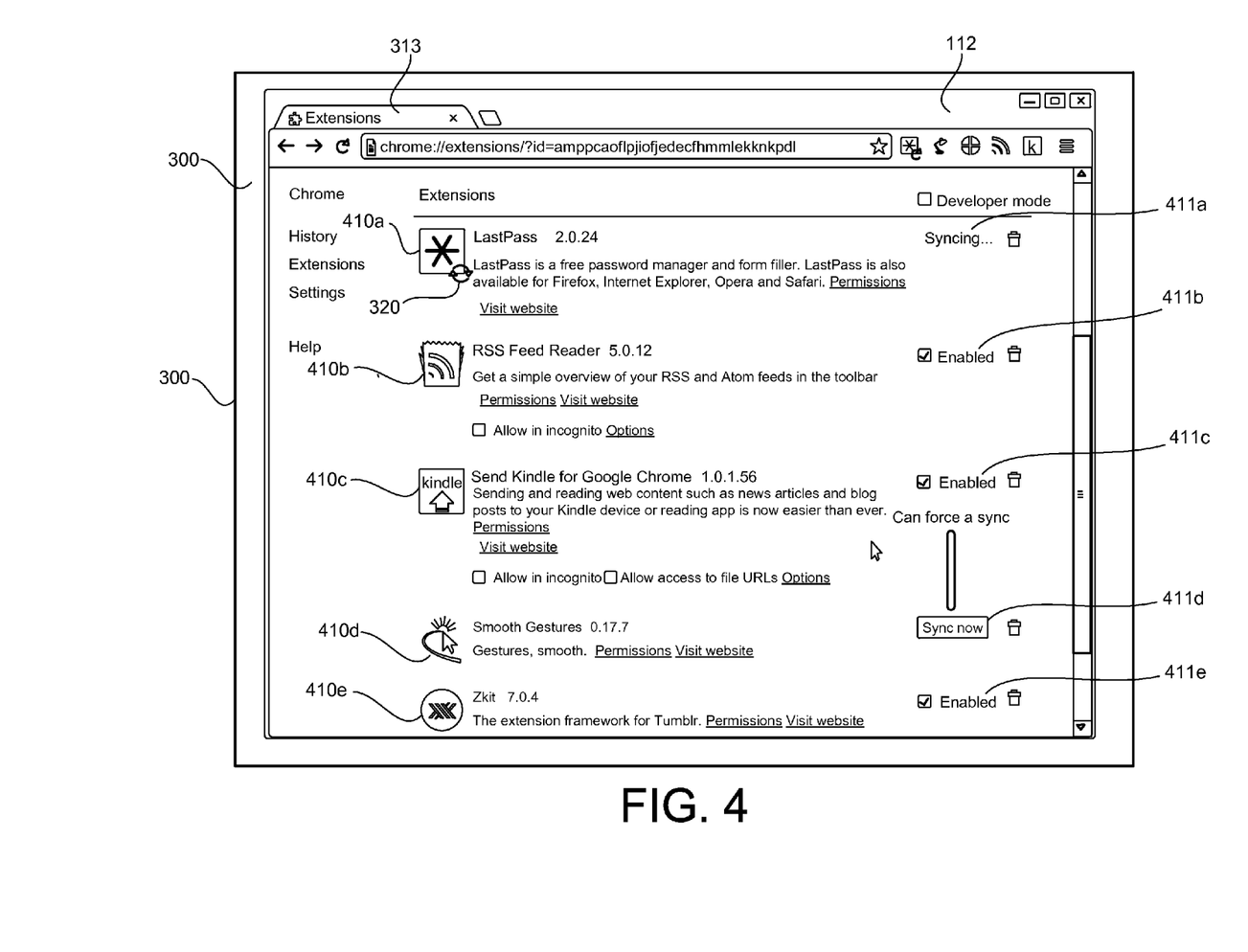
FIG. 4 is a schematic illustration of an example user interface (UI) by which a computing service module/app synchronizer may receive user input or demand for synchronizing or downloading particular web apps or web browser extensions, in accordance with the principles of the disclosure herein.

FIG. 4 shows an example UI 400 by which computing service module 180/app synchronizer 181 may receive user input or demand for synchronizing or downloading particular web browser extensions.

In the example UI shown in FIG. 4, individual web browser extensions may be depicted visually by icons (e.g., icons 410a-410e) in web browser tab 313 on computing device 300. The icons may be marked distinctively, for example, by color, brand name or logos for easy visual identification of the corresponding browser extensions. The icons may be further marked or associated with other indicia (e.g., 411a-411d) that may visually indicate the synchronization states of the corresponding individual browser extensions. For example, icons 410b, 410c and 410e, which may correspond to browser extensions that have been synchronized, may be displayed as being in a synchronized state (e.g., undimmed and in full color). These icons may be further associated with graphical elements such as checkboxes (e.g., 411b, 411c and 411e, respectively,) that are labeled as "enabled," indicating that the corresponding browser extensions are synchronized and available for use by the user.

Further, for example, in UI 400 browser extensions which are not yet synchronized (e.g., icons 410a and 410d) may be visually marked as being disabled (e.g., greyed out or dimmed). Icon 410a may be further marked by or associated with text "syncing" 411a, indicating that the corresponding web browser extension is presently being synchronized. Icon 410d may be associated with an interactive button (e.g., "sync now" button 411d), indicating that the corresponding web browser extension has not yet been synchronized and is awaiting user instructions or demand for synchronization. The user may at any time demand synchronization or downloading of the corresponding web browser extension by activating the associated interactive button (e.g., sync now button 411d).

With renewed reference to FIG. 1, it will be understood that the figure shows a particular distribution or arrangement of system components (i.e. web store 155, public or private cloud data storage service 158, cloud computing service module 180, etc.) only for purposes of example illustration of system 100. Various other implementations of system 100 may have other distributions or arrangements of the components, which may be hosted on one or more physical or virtual servers on network 190, and may involve less or more components than shown in FIG. 1. Further, it will be further understood that the particular UI arrangements of FIGS. 2-4 are shown and described herein only as examples to illustrate the operation of system 100. Various other UI arrangements may be used in system 100.

Figure 5:
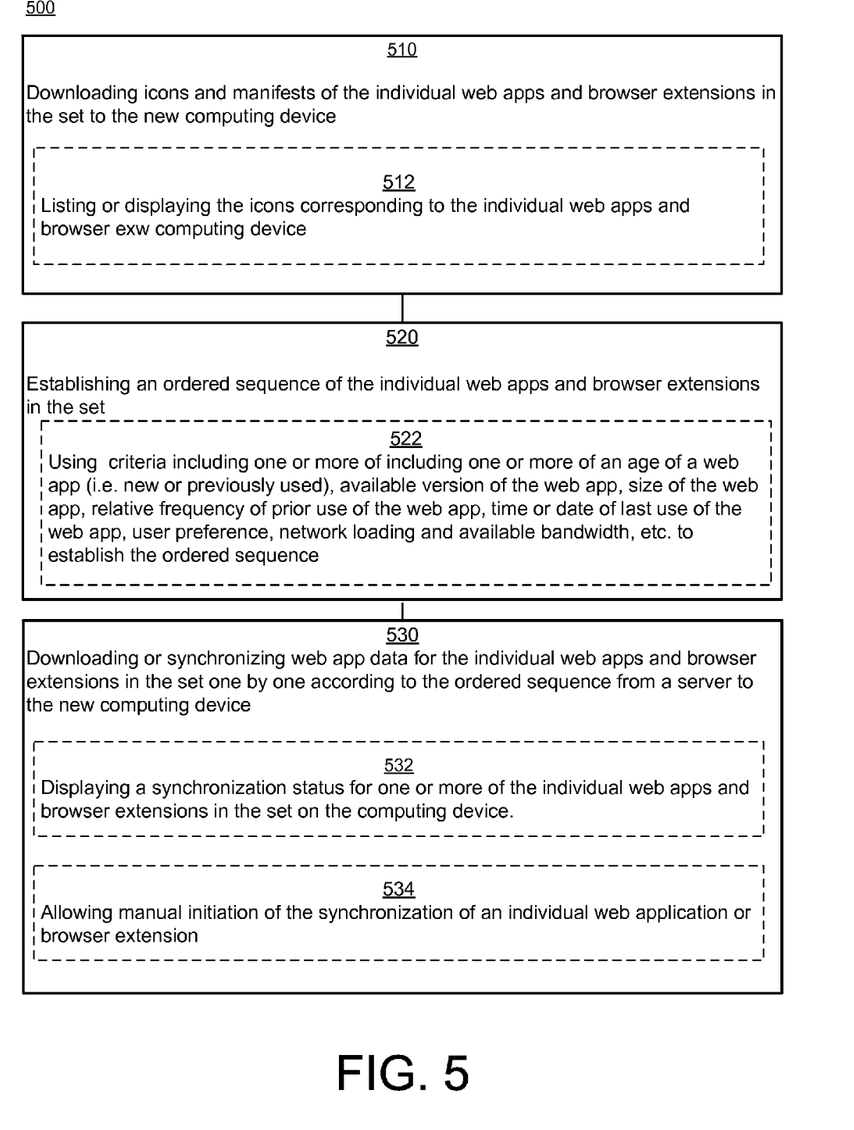
FIG. 5 is a flow diagram illustration of an example method for synchronizing or downloading a set of one or more web apps and/or browser extensions to a user's new computing device (e.g., laptop computer, notebook computer, smart phone etc.), in accordance with the principles of the disclosure herein.

FIG. 5 is a flow diagram which illustrates an example method 500 for synchronizing or downloading a set of one or more web apps and/or browser extensions to a user's new computing device (e.g., laptop computer, notebook computer, smart phone etc.), in accordance with the principles of the disclosure herein. The set of one or more web apps and/or browser extensions may have been used on a previous computing device and associated with the user's account with a cloud computing service.

Method 500 includes downloading icons and manifests of the individual web apps and browser extensions in the set to the computing device (510), establishing an ordered synchronization sequence for the individual web apps or browser extensions in the set (520), and downloading or synchronizing, from a server to the computing device, web app data for the individual web apps or browser extensions in the set according to the ordered synchronization sequence (530).

In method 500, downloading icons and manifests of the individual web apps or browser extensions in the set to the computing device 510 may include listing or displaying the icons corresponding to the individual web apps or browser extensions on the new computing device (512). Further, establishing an ordered synchronization sequence of the individual web apps or browser extensions in the set 520 may include identifying individual web apps or browser extensions that are more likely to be used first before other web apps or browser extensions on the user's new computing device using, for example, criteria such as frequency of prior use and recency of usage of the web app by the user (522) and prioritizing synchronization of the more-likely-to-be-used-first. web apps or browser extensions with consideration of other factors including, for example, web app size, user preference or demand for a particular web app or browser extension, and communication network conditions such as available bandwidth, and reliability, etc. (524).

Further, downloading or synchronizing web app data for the individual web apps or browser extensions in the set according to the ordered synchronization sequence to the new computing device 530 may include displaying a synchronization status for one or more of the individual web apps or browser extensions in the set on the computing device (532). Displaying a synchronization status 532 may, for example, include displaying individual web applications or browser extensions that have been synchronized as enabled, and displaying individual web applications or browser extensions that have not been synchronized or are being currently synchronized as disabled.

Method 500 may further include allowing user initiation of the synchronization of an individual web application or browser extension (534). Allowing user initiation of the synchronization of an individual web application or browser extension may include providing an interactive graphical use interface (GUI) element (e.g., icon, button, checkbox, etc.) on the computing device, which can be user activated to initiate the synchronization. Method 500 may include synchronizing application data for one or more individual web apps or browser extensions only in response to activation of the interactive GUI element on the computing device.

A computer system (e.g., system 100) may be deployed to implement method 500 in conjunction with a non-transitory computer-readable storage medium having instructions stored thereon. The instructions when executed by one or more microprocessors (e.g., silicon-based hardware processors) may cause the computer system to implement method 500 as described above with reference to FIG. 5.

Figure 6:
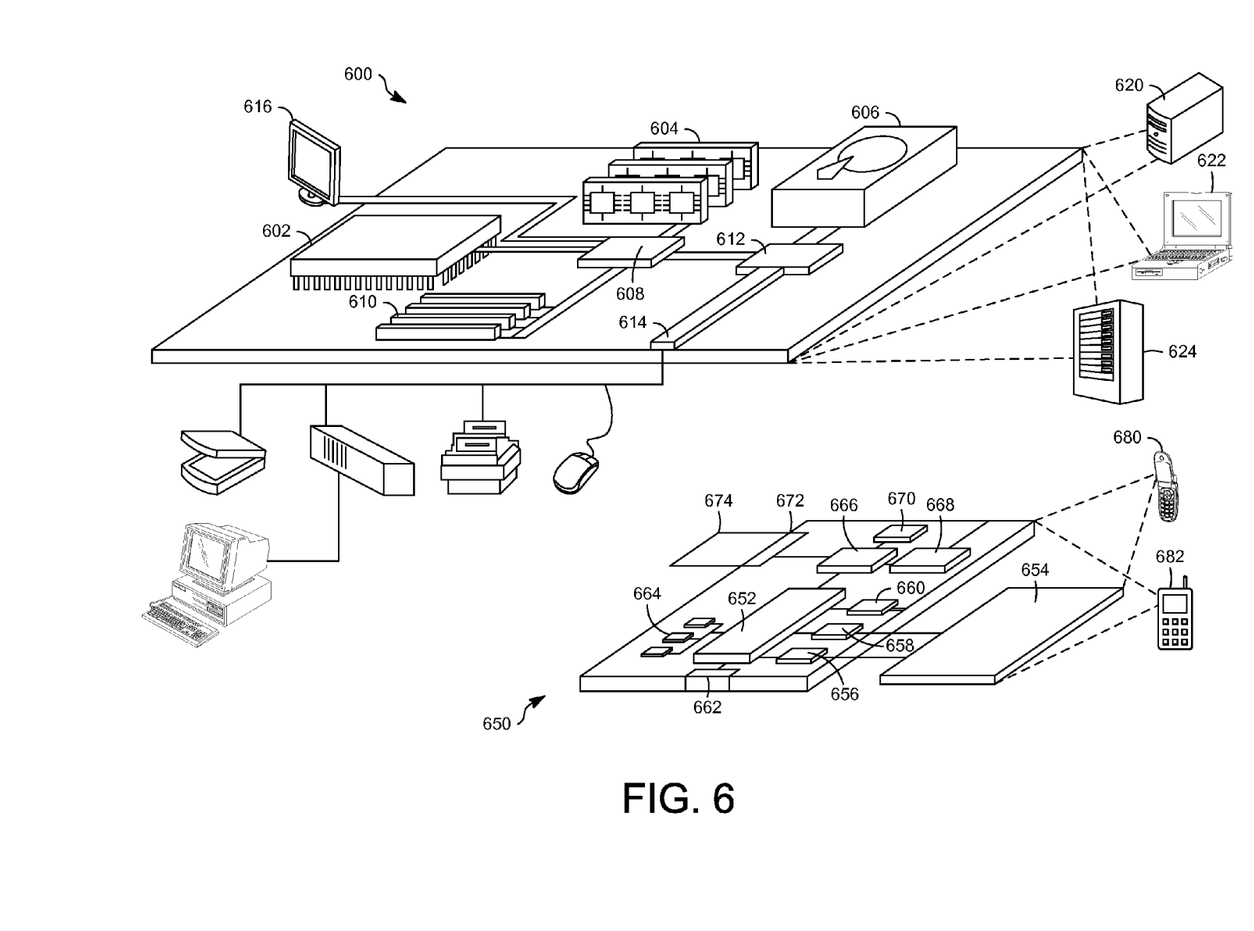
FIG. 6 is a schematic illustration of a generic computer device and a generic mobile computer device, which may be used with the techniques described herein.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, and an input/output device such as a display 654, a communication interface 666, and a transceiver 668, among other components. The device 650 may also be provided with a storage device, such as a microdrive or other device, to provide additional storage. Each of the components 650, 652, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    maintaining, on a server, a list of individual web applications and browser extensions in a personalized set of web applications associated with a user account;
    sending from the server, over a network, one or more application stubs corresponding to the individual web apps or browser extensions in the set to the computing device, the application stubs being short program routines that substitute for respective ones of the individual web apps or browser extensions;
    establishing an ordered synchronization sequence of the individual web apps or browser extensions in the set, the ordered synchronization sequence prioritizing synchronization of the individual web apps or browser extensions in the set by size and/or a likelihood of use of the individual web apps or browser extensions on the user's computing device; and
    sending, from the server to the computing device, application data associated with the individual web apps or browser extensions to synchronize the individual web apps or browser extensions in the set according to the ordered synchronization sequence.

2. The method of claim 1, wherein sending application stubs of the individual web apps or browser extensions in the set to the computing device further includes sending application icons and/or application manifests corresponding to the individual web apps or browser extensions to the computing device.

3. The method of claim 1, wherein sending application data associated with the individual web apps or browser extensions in the set includes sending executable code associated with one or more of the individual web apps or browser extensions in the set.

4. The method of claim 1, wherein prioritizing synchronization of the individual web apps or browser extensions in the set by size and/or a likelihood of use of the individual web apps or browser extensions on the user's computing device includes determining a likelihood of use of a web app based on one or more of a frequency of prior use of the web app, a recency of usage of the web app, and a user preference or demand for the web app.

5. The method of claim 1, wherein sending application data associated with the individual web apps or browser extensions in the set according to the ordered sequence includes displaying, on the computing device, a synchronization state for one or more of the individual web apps or browser extensions in the set.

6. The method of claim 5, wherein displaying a synchronization status for one or more of the individual web apps or browser extensions in the set on the computing device includes displaying individual web applications or browser extensions that have been synchronized as being enabled and displaying individual web applications or browser extensions that have not been synchronized or are being currently synchronized as being disabled.

7. The method of claim 1 further comprising providing a graphical user interface (GUI) element on the computing device to initiate synchronization of one or more of the individual web apps or browser extensions in the set.

8. The method of claim 7 further comprising, in response to a user's selection of the interactive GUI element, initiating synchronization of one or more of the individual web apps or browser extensions in the set superseding or pausing any in-progress synchronization of other individual web apps or browser extensions in the set according to the ordered synchronization sequence.

9. The method of claim 7, wherein sending application data associated with the individual web apps or browser extensions in the set according to the ordered synchronization sequence includes sending application data for the individual web app or browser extension only in response to receiving the user's selection of the GUI element.

10. A system comprising:
one or more servers connectable to a computing device via a communications network;
the one or more servers configured to maintain a list of individual web applications and browser extensions in a personalized set of web applications associated with a user account and send one or more application stubs corresponding to the individual web apps or browser extensions to the computing device, the application subs being short program routines that substitute for respective ones of the individual web apps or browser extensions; and
an application synchronizer configured to send, from a server to the computing device, application data associated with the individual web apps or browser extensions in the set according to an ordered synchronization sequence,
the ordered synchronization sequence prioritizing synchronization of the individual web apps or browser extensions in the set by size and/or a likelihood of use of the individual web apps or browser extensions on the user's computing device.

11. The system of claim 10, wherein the application synchronizer is configured to send one or more application stubs corresponding to the individual web apps or browser extensions in the set to the computing device before sending application data associated with the individual web apps or browser extensions in the set according to the ordered synchronization sequence.

12. The system of claim 11, wherein the application synchronizer is configured to further send one or more application icons and/or application manifests corresponding to the individual web apps or browser extensions to the computing device.

13. The system of claim 10, wherein the application synchronizer is configured to send application data including executable code associated with one or more of the individual web apps or browser extensions in the set.

14. The system of claim 10, wherein the application synchronizer is configured to determine a likelihood of use of a web app based on one or more of a frequency of prior use of the web app, a recency of usage of the web app, and a user preference or demand for the web app.

15. The system of claim 10, wherein the application synchronizer is configured to display, on the computing device, a synchronization state for one or more of the individual web apps or browser extensions in the set.

16. The system of claim 15, wherein the application synchronizer is configured to display, on the computing device, individual web applications or browser extensions that have been synchronized as being enabled and display individual web applications or browser extensions that have not been synchronized or are being currently synchronized as being disabled.

17. The system of claim 10, wherein the application synchronizer is configured to display, on the computing device, a graphical user interface (GUI) element on the computing device to initiate synchronization of one or more of the individual web apps or browser extensions in the set.

18. The system of claim 17 wherein the application synchronizer is configured to, in response to a user's selection of the GUI element, initiate synchronization of one or more of the individual web apps or browser extensions in the set superseding or pausing any in-progress synchronization of other individual web apps or browser extensions in the set according to the ordered synchronization sequence.

19. The system of claim 17 wherein the application synchronizer is configured to send application data for the individual web app or browser extension only in response to receiving the user's selection of the GUI element.

20. A non-transitory computer-readable storage medium having instructions stored thereon, which instructions when executed by one or more microprocessors cause a computer system to:
maintain, on a server, a list of individual web applications and browser extensions in a personalized set of web applications associated with a user account;
send, over a network, to a computing device, application stubs corresponding to the individual web apps or browser extensions in the personalized set of web applications, the application stubs being short program routines that substitute for respective ones of the individual web apps or browser extensions;
establish an ordered synchronization sequence of the individual web apps or browser extensions in the set, the ordered synchronization sequence prioritizing synchronization of the individual web apps or browser extensions in the set by size and/or a likelihood of use of the individual web apps or browser extensions on the user's computing device; and synchronize, from a server to the computing device, application data associated with the individual web apps or browser extensions in the set according to the ordered sequence.

21. The non-transitory computer-readable storage medium of claim 20, wherein the instructions when executed by one or more microprocessors:

determine a likelihood of use of a web app based on one or more of a frequency of prior use of the web app, a recency of usage of the web app, and a user preference or demand for the web app.

* * * * *

UNITED STATES PATENT AND TRADEMARK OFFICE
CERTIFICATE OF CORRECTION

| | | |
|---|---|---|
| PATENT NO. | : 9,769,258 B1 | Page 1 of 1 |
| APPLICATION NO. | : 14/575580 | |
| DATED | : September 19, 2017 | |
| INVENTOR(S) | : Kay | |

It is certified that error appears in the above-identified patent and that said Letters Patent is hereby corrected as shown below:

In the Claims

In Column 15, Line 55, Claim 10, delete "subs" and insert -- stubs --, therefor.

In Column 16, Line 39, Claim 18, delete "17 wherein" and insert -- 17, wherein --, therefor.

In Column 16, Line 46, Claim 19, delete "17 wherein" and insert -- 17, wherein --, therefor.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*